No. 853,284. PATENTED MAY 14, 1907.
W. L. WATERS.
ELASTIC FLUID TURBINE.
APPLICATION FILED JULY 18, 1904.
5 SHEETS—SHEET 2.
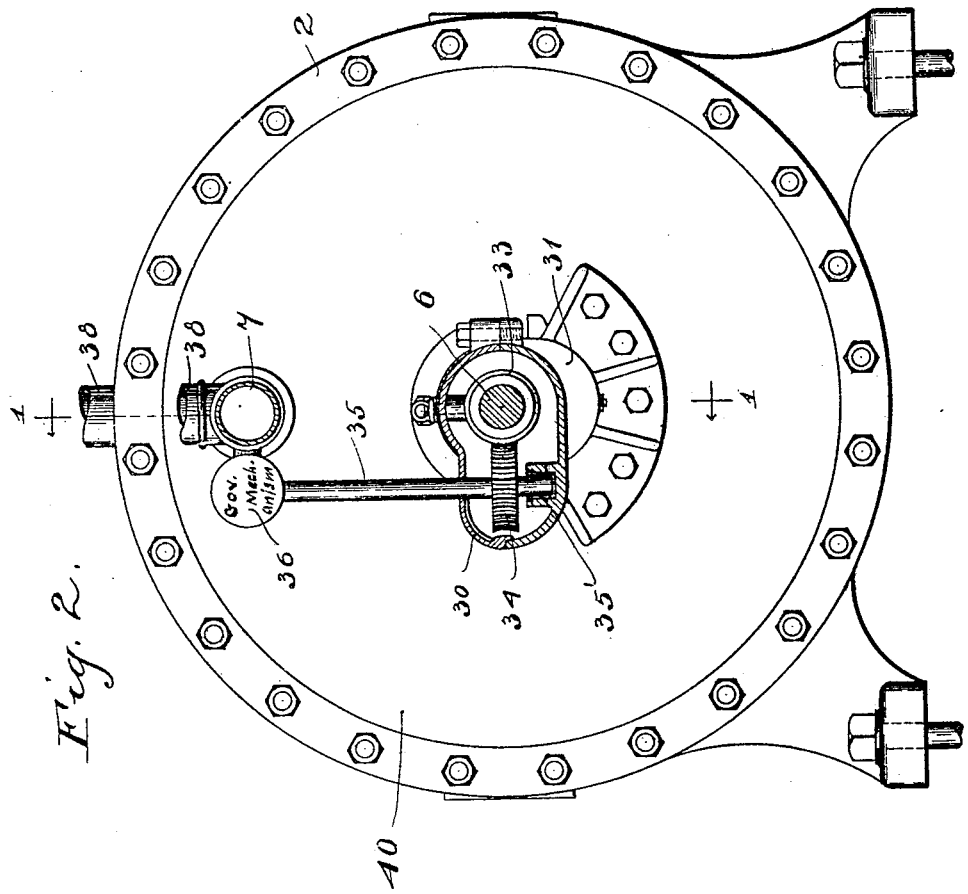
Witnesses:
Arthur H. Boettcher.
Charles J. Schmidt.
Inventor
William L. Waters
By Charles A. Brown
Attorney No. 853,284. PATENTED MAY 14, 1907.
W. L. WATERS.
ELASTIC FLUID TURBINE.
APPLICATION FILED JULY 18, 1904.
5 SHEETS—SHEET 3.
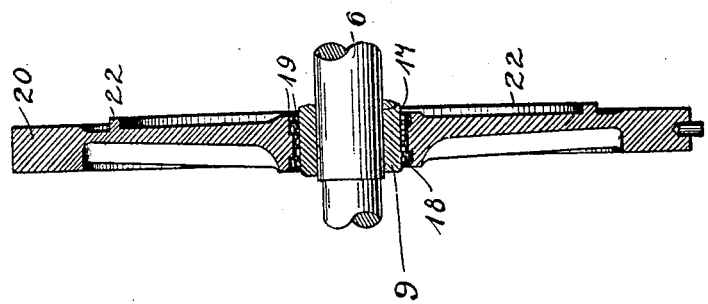
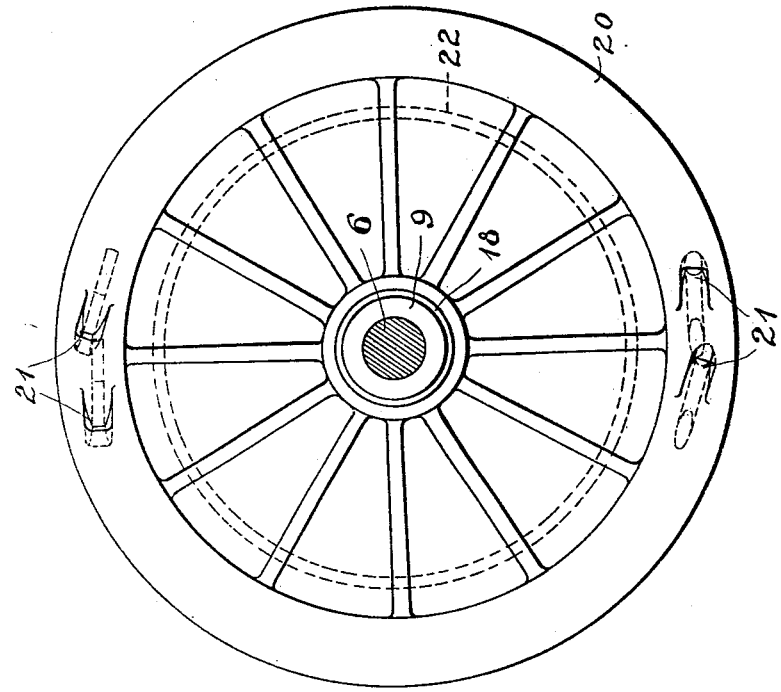
Witnesses:
Arthur H. Boettcher
Charles J. Schmidt
Inventor
William L. Waters
By Charles A. Brown
Attorney No. 853,284. PATENTED MAY 14, 1907.
W. L. WATERS.
ELASTIC FLUID TURBINE.
APPLICATION FILED JULY 18, 1904.
5 SHEETS—SHEET 4.
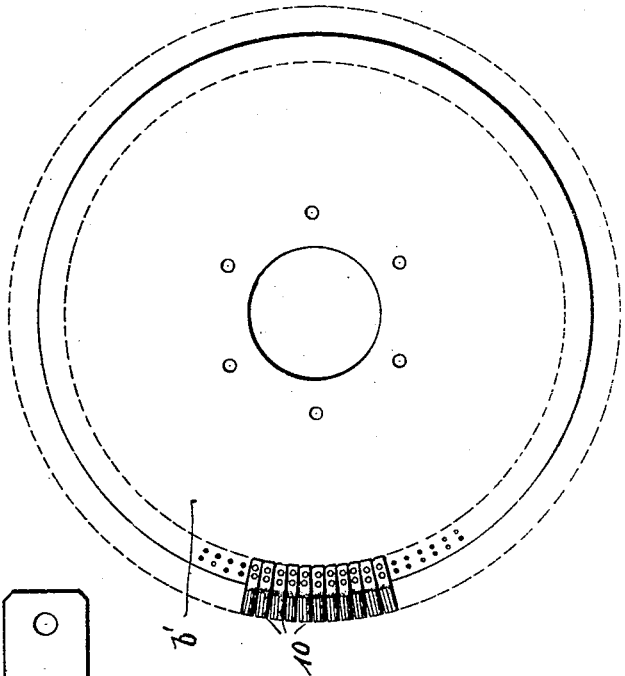
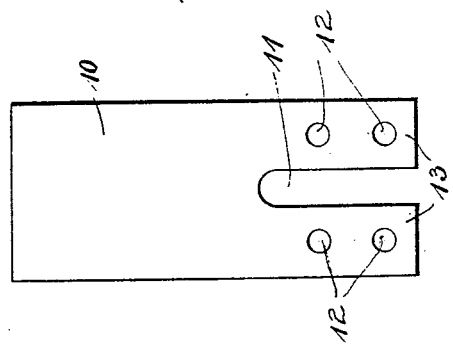
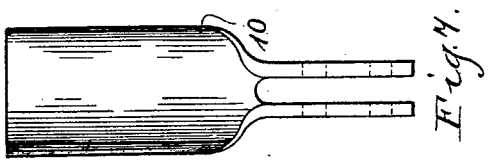
Witnesses:
Arthur H. Boettcher,
Charles J. Schmidt.
Inventor
William L. Waters
By Charles A. Brown
Attorney.

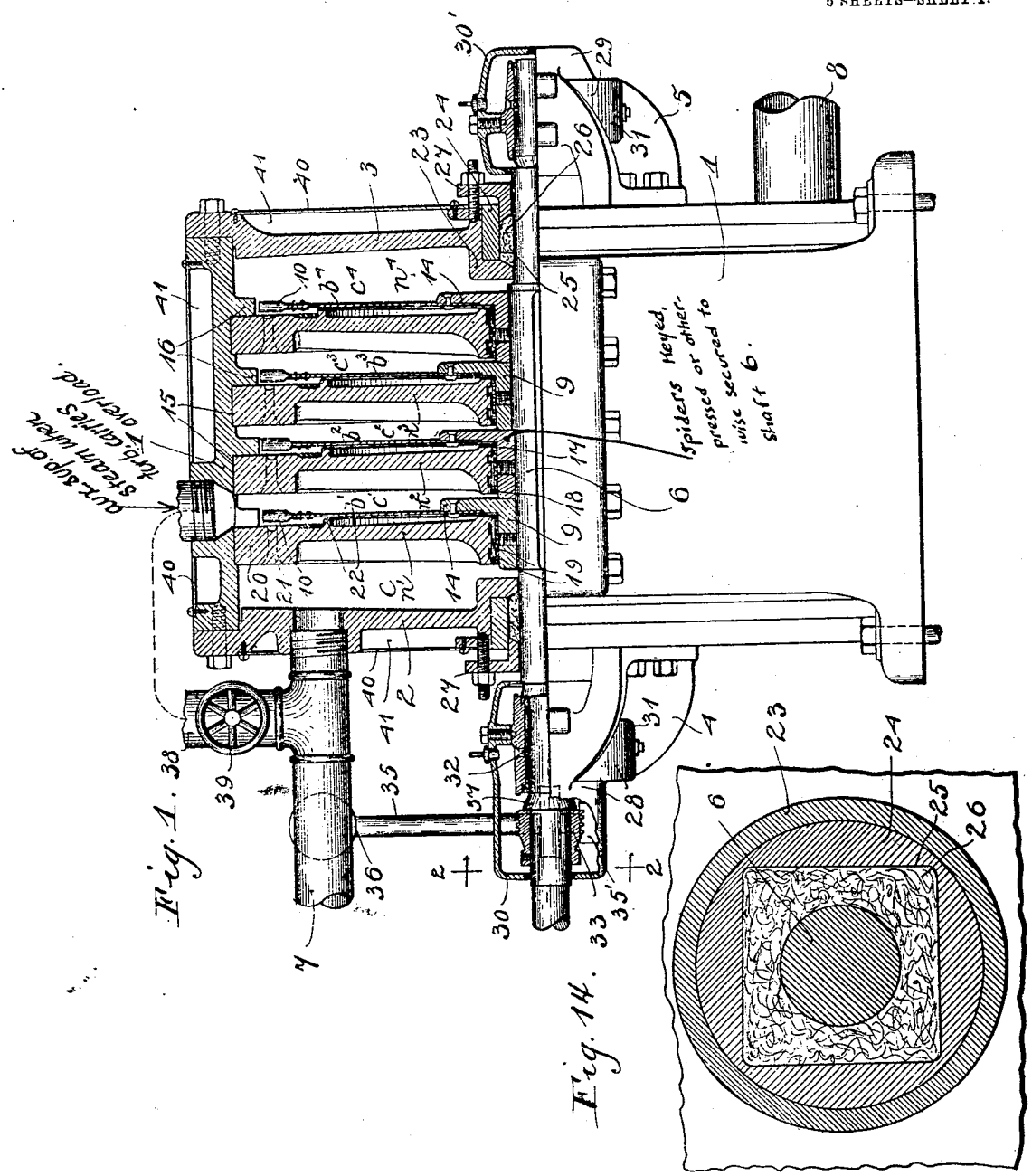

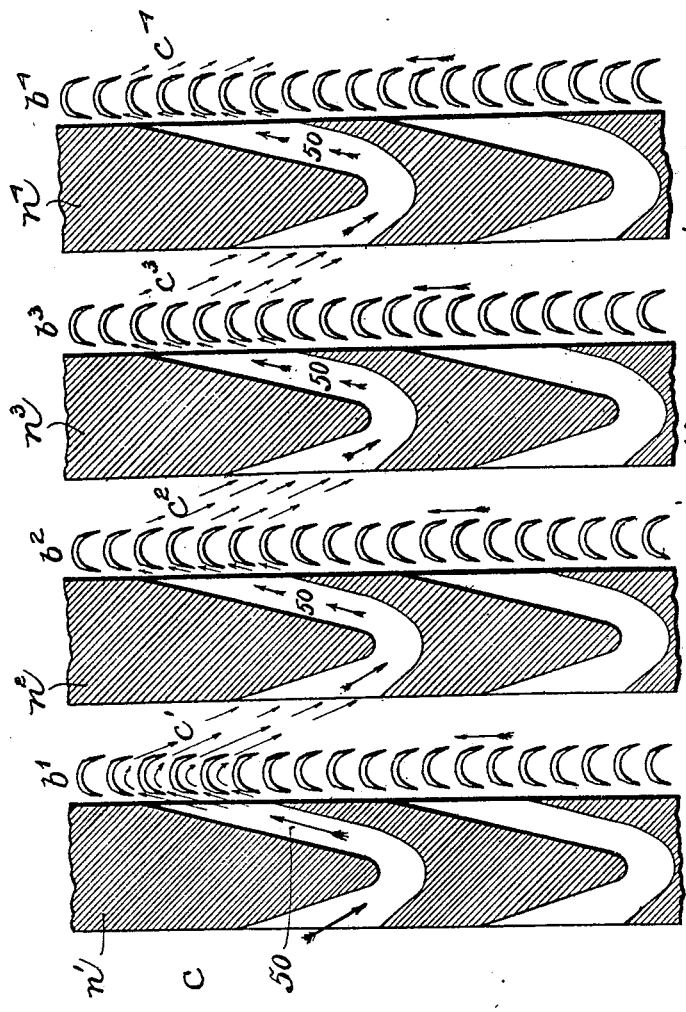
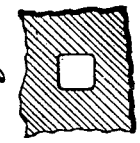
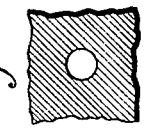

UNITED STATES PATENT OFFICE.

WILLIAM L. WATERS, OF MILWAUKEE, WISCONSIN, ASSIGNOR TO NATIONAL BRAKE & ELECTRIC COMPANY, OF MILWAUKEE, WISCONSIN, A CORPORATION OF WISCONSIN.

ELASTIC-FLUID TURBINE.

No. 853,284. Specification of Letters Patent. Patented May 14, 1907.

Application filed July 18, 1904. Serial No. 216,927.

*To all whom it may concern:*

Be it known that I, WILLIAM L. WATERS, a subject of the King of England, and residing at Milwaukee, in the county of Milwaukee and State of Wisconsin, have invented a certain new and useful Improvement in Elastic-Fluid Turbines, (Case 9,) of which the following is a full, clear, concise, and exact description, reference being had to the accompanying drawings, forming a part of this specification.

My invention relates to fluid turbines, particularly to steam turbines, and its object is to provide novel and more simplified and efficient construction and arrangement of the operative parts thereof.

My improved turbine is of the multi-cellular multiple expansion type and consists of an outer cylinder divided into a number of compartments by a plurality of nozzle plates, a bucket disk being adapted for rotation within each compartment. The steam enters at one end, passes through all the nozzle plates, and emerges from the other end of the cylinder either into the atmosphere or into a condenser. Each nozzle plate is provided with a number of nozzles, by means of which the energy of the steam is converted into velocity, this operation being performed fractionally through each nozzle plate so that the pressure in the compartment falls gradually from the entrance end to the axis end.

The shape of the nozzles is one of the principal features of my invention, the nozzles being so shaped that any velocity energy remaining in the steam after it has passed a set of revolving buckets is not lost but is received in the next set of nozzles where the steam is further expanded and the velocity thereof again substantially raised to the velocity it had before striking the first set of buckets, and thus in every set of nozzles a fraction of the pressure is extracted, resulting in the corresponding amount of expansion and ultimate velocity of the steam, the velocity of the steam emerging from each set of nozzles being substantially the same. To this end, the nozzles are convergent, the angle of entrance being such as to receive the steam at the correct angle as it comes from the revolving buckets and the angle of exit being such as to deliver the steam to the next set of revolving buckets, the cross section of the nozzles being suitably shaped and successively increased so as to take care of the increased volume of the steam as it expands on its passage through the successive nozzles. The advantage of this feature is that it enables a high rate of expansion from one compartment to the next to be obtained, together with the correspondingly high velocity of jet, without making it necessary to use an extremely high velocity of the revolving buckets to obtain good efficiency, the buckets being so shaped as to extract the required velocity from the velocity of the steam passing therethrough, this extracted velocity being substantially again replaced in the succeeding nozzle plate, as above described.

My invention also includes other important mechanical features of construction. The buckets may be cast or stamped and shaped of sheet material in one operation and are secured to the periphery of bucket disks, which are plane disks of sheet steel of great tensile strength, and thus entirely uniform. The buckets are preferably composed of an alloy of nickel and aluminium which gives them great tensile strength and lightness and are symmetrically saddled over the edge of the bucket disks and thus the centrifugal strains on the disks are reduced to a minimum. The bearings for my improved machine are disposed entirely without the cylinder and are thus not subjected to the contact with hot steam.

The machine and its construction and arrangement of parts will be better understood by reference to the accompanying drawings, in which:—

Figure 1 shows an elevation view, the top half being in longitudinal vertical section, Fig. 2 is an end elevation and partly sectional view on the line 2—2 of Fig. 1, Fig. 3 is an elevation view of a nozzle plate, Fig. 4 is a diametrical sectional view of the nozzle plate, Fig. 5 is an elevation view of the bucket disk, Fig. 6 shows a bucket stamping, Fig. 7 is an elevation view of the finished bucket bent into shape from the stamping, Fig. 8 is a side view of the finished bucket. Fig. 9 is a top view of the bucket, Fig. 10 is a diagrammatic developed view showing the arrangement and construction of the nozzles and buckets and the path of the steam therethrough, Figs. 11 and 12 show different sections of nozzles which may be employed, Fig. 13 is a developed view of a nozzle section, and Fig. 14 is a detail enlarged view of a stuffing box employed.

Like characters of reference refer to like parts throughout the various figures.

The machine consists of a cylindrical shell 1 secured between end plates 2 and 3. Bearing brackets 4 and 5 are respectively secured to the end plates 2 and 3 and serve to journal the shaft 6. The cylindrical chamber is divided into a plurality of compartments $c$, $c^1$, $c^2$, $c^3$ and $c^4$ by nozzle plates $n^1$, $n^2$, $n^3$ and $n^4$. Bucket disks $b^1$, $b^2$, $b^3$ and $b^4$ respectively rotate in compartments $c^1$, $c^2$, $c^3$ and $c^4$, live steam being led into compartment $c$ from a supply pipe 7 and led from the chamber $c^4$ through an exhaust pipe 8 either into the atmosphere or into a condenser. The bucket wheels are formed of plane disks of sheet metal, preferably steel, and are each secured to a spider 9, keyed, pressed, or otherwise secured on the shaft 6. Buckets 10, 10 extend from the bucket disks throughout the entire periphery thereof, the buckets being cast or stamped from sheet material consisting preferably of an alloy of nickel and aluminium, which gives the buckets great tensile strength combined with a great degree of lightness.

A bucket stamping is shown in Fig. 6 and is substantially rectangular in shape, a slot 11 and rivet holes 12, 12 being punched therefrom. The blank is then bent so that the body portion thereof forms the bucket and the ends 13 face each other to form a saddle for engaging over the peripheral edge of the bucket disks, as best shown in Fig. 7. The angles of entrance and exit of the buckets are the same as best shown in Fig. 9, the edges of the buckets being sharp, as shown, these edges being formed by milling the blank bars or sheets before stamping the buckets therefrom. The disks are bolted or riveted to the flanges 14 of the spiders 9, each disk being in close proximity to the corresponding nozzle plate from which its buckets receive their steam supply.

The cylinder 1 is provided on its interior with annular pockets 15 and shoulders 16, the pockets 15 receiving the periphery of the nozzle plates, and the shoulders 16 serving as abutments for the nozzle plates and also forming walls about the outer edges of the buckets to confine the flow of the steam to the buckets. The nozzle plates may be of one piece or of sections and each nozzle plate is provided with a central opening 17 through which passes the hub part of the corresponding bucket disk spider. The openings of the stationary nozzle plates are lined with bushings 18 of soft bearing material and these bushings are provided with water packing grooves 19, 19 which prevent leakage of steam, as is well known in the art. These soft metal bushings prevent any cutting of the relatively movable parts, even if the whirling of the shaft should cause the spiders to strike. The nozzle plates consist of a rim portion 20 through which the nozzle passages 21, 21 are formed, the web part of the plates being of any suitable construction to insure sufficient rigidity and to obtain lightness. Each plate is provided with an annular ridge 22 projecting toward the associated bucket disk. The clearance between this annular ridge and the bucket disk is very slight and much slighter than the clearance between the edges of the buckets and the nozzle outlets. Thus upon any displacement occurring in the bucket disks, the disks will strike the ridge before the buckets strike the rim 20 and injury to the buckets is thereby prevented. The shaft 6 passes through the end walls 2 and 3, which are provided with stuffing boxes 23, shown in detail in Fig. 14. Each stuffing box is provided with a bushing 24 having a square opening 25 through which the shaft passes. Suitable packing 26 is forced between the shaft and the bushing 24 by means of the cover 27. The bushing 24 is secured in the box 23 and, as the shaft turns, the packing will be prevented from turning therewith, owing to the square opening in the bushing, and consequently the leakage of steam through the stuffing boxes is entirely prevented. In the stuffing boxes heretofore employed, the opening through the bushing is round and therefore the packing will sooner or later turn with the shaft, and leakage of steam result. The journal boxes 28 and 29 are supported from the brackets 4 and 5, respectively, and, as shown, are disposed entirely without the cylinder and consequently are not in the least affected by the hot steam, as has heretofore been the case in machines of this class in which the bearings were at all times surrounded by steam which caused great difficulty to be encountered in maintaining proper lubrication. The journal boxes are respectively entirely surrounded by housings 30 and 30' each housing carrying an oil well 31 for supplying oil to the oil rings 32. A worm 33 is keyed to the shaft within the housing 30 and is engaged by a worm wheel 34, carried on the vertical governor shaft 35, journaled in the bearing pocket 35', extending from the lower wall of the housing 30, as best shown in Fig. 2. The governor shaft 35 engages with governor mechanism diagrammatically represented by the circle 36, which governor mechanism controls the steam supply to compartment $c$. The shaft 6 has an annular inclined shoulder 37 between the shaft bearing and the worm 33. The oil fed to the shaft from the ring 32 passes along the shaft and is thrown outwardly and upwardly from the shoulder 37 to be distributed to the worm 33 and worm wheel 34, the surplus oil returning to the oil cup 31, and thus perfect lubrication is assured.

I have shown a by-pass 38 controlled by a valve 39, leading from the main supply pipe to the compartment $c^1$ and full steam pressure may be admitted to this compartment, when the turbine is driving an overload, for instance. To prevent loss of power, due to radiation of heat, I provide an air blanket for the turbine, and the end plates and the cylinder 1 may therefore be flanged at their edges, the plates 40 of sheet material being secured to the flanged edges to form air chambers 41, surrounding the turbine. The machine is thus not susceptible to sudden changes of temperature as the air blankets prevent radiation of the heat. The spaces 41 may also be filled with some non-conducting material, such as asbestos, which will serve the same purpose as the layer of air.

I shall now describe the construction and arrangement of the nozzles and their association with the buckets, this being best shown in the developed view in Fig. 10. Each nozzle plate may be provided with nozzles throughout its circumference or only a few nozzles may be utilized and placed at various positions. It will be seen that the nozzles are convergent, the angle of entrance being such as to receive the steam at the correct angle as it comes from the revolving buckets and the angle of exit being such as to deliver the steam jet at the proper angle to the buckets, without losing any of the velocity energy which still remains in the steam after it has passed from a row of buckets. The outlet channels 50 of the nozzles are comparatively long and have parallel sides, and thus the steam passing therethrough, is further expanded. The proportions are such that after a certain amount of velocity energy has been extracted by one set of buckets, the steam with the remaining velocity energy passes into the succeeding nozzles and, upon passage through the outlet chambers, expansion takes place, and an amount of velocity energy is added to the steam substantially equal to the amount absorbed by the preceding buckets and the steam leaves the nozzle with substantially its initial velocity to pass through the second set of buckets where an amount of velocity energy is again extracted and upon passage through the next set of nozzles this velocity is again substantially returned, and so on until all the pressure of the steam has been transformed into velocity. For illustration, starting at the left of Fig. 10, the steam will enter the nozzles of the nozzle plate $n^1$ at full pressure and upon passage through the corresponding outlet channels 50 will be reduced in pressure with a corresponding expansion to obtain the desired velocity. The design of the buckets may be such as to produce a bucket velocity much less than the steam jet velocity, which is very desirable in the steam turbine art. In other words, the buckets may be so designed that as the steam jet at full velocity passes therethrough only a sufficient fraction of the velocity energy will be extracted by the buckets to give the required bucket speed. As the steam with its remaining velocity energy leaves the buckets of bucket disk $b^1$, it is properly received by the entrances of the nozzles in nozzle plate $n^2$, and as the steam passes through the outlet channels 50 of this nozzle plate, a further reduction of pressure takes place with a corresponding expansion and the velocity added to the steam on account of this expansion is substantially equal to the amount lost by the steam in passing through the buckets of bucket disk $b^1$ and the steam jet emerging from the nozzle plate $n^2$ has substantially the same initial velocity as when it struck the bucket wheel $b^1$. The steam on passing through the buckets on bucket wheel $b^2$ again supplies part of its velocity energy to these buckets and upon leaving the buckets is received by the nozzles in nozzle plate $n^3$ and, upon passing through the outlet channels thereto, the initial velocity is substantially again restored and the same action takes place through nozzle plate $n^4$, the steam after leaving the buckets of the last bucket disk $b$ being entirely exhausted and passing either into the open or into a condenser. As the steam expands from one compartment to another, the total cross section of the nozzles in any one nozzle plate must, of course, increase in the successive plates in order to take care of this increased volume of the steam. This may be done by increasing the number of nozzles in the successive plates but the better way would be to keep the number of nozzles the same in the plates and to increase their cross section, as shown in Fig. 10, where the cross section of each succeeding set of outlet channels is slightly increased. By keeping the number of nozzles alike in the successive plates, the steam upon leaving one nozzle and passing through the buckets emerges as an almost solid jet and it is better for this jet to be received by another single nozzle than by several nozzles which would tend to break up the jet and cause eddy-currents and a constant loss of kinetic energy. The section of the nozzles may be round, as shown in Fig. 11, or may be square, as shown in Fig. 12, or may be of any other shape, depending upon conditions and requirements. Fig. 13 shows one form of nozzle developed and the proportions best suited for accomplishing the results above described in a particular turbine.

By the construction and arrangement above outlined, I am enabled to obtain a high rate of expansion from one compartment to the next and, consequently, a correspondingly high velocity of steam flow without the necessity of an extremely high bucket velocity to obtain good efficiency, the buckets being so designed as to extract just the required amount of energy to give the proper velocity to the turbine. Again, by the novel method of compensating in each set of nozzles for the velocity energy extracted by the preceding buckets, the diameters of the bucket disks and their peripheral velocities may be all alike, which greatly simplifies the construction of the machine. It will also be readily seen from the description and drawings that the construction of the parts and the arrangement thereof is very simple, it being possible to readily construct and finish each part separately. By removing the top half of the cylindrical shell $l$, all the parts are open for inspection and upon assembling, the disk spiders may very readily be pressed or otherwise secured on the shaft into position and the nozzle plates set into position in the pockets 15 and against the shoulders 16, whereupon the top half of the shell may be bolted into place. As the journal boxes are entirely without the machine, they are at all times open for inspection even while the machine is running, the lubrication being in no way interfered with by the steam.

Owing to the above described manner of saddling buckets of light uniform material symmetrically over the edge of the bucket wheels which are plain disks of uniform sheet material, the centrifugal strains are reduced to a minimum and additional strengthening parts and additional parts, such as rims for carrying the buckets, are unnecessary. The construction of the turbine is thus greatly simplified and the cost reduced. The shape of the nozzles is also such that the nozzle plates may be cast and the nozzles need not be finished, it being only necessary to remove burs or other large impediments, which may readily be done with ordinary tools. The construction and position of the steam packing is also very simple and efficient.

Having thus described my invention, I do not wish to be limited to the exact construction or arrangement of the parts as shown, as changes may readily be made therein without departing from the scope of the invention.

I desire to secure by Letters Patent:—

1. In a steam turbine, the combination with an inclosing cylinder, of a shaft extending therethrough, spiders secured to said shaft, each spider consisting of a hub and a flange portion, a nozzle plate encircling each hub portion, said plates dividing said cylinder into a plurality of compartments into which said flange portions extend, a bucket wheel in each compartment secured to the corresponding flange, said bucket wheels being in the form of integral plane disks of sheet material, and buckets clamped symmetrically over the entire edge of said disks, said buckets being also formed from sheet material.

2. In a turbine, the combination with an inclosing cylinder, of a nozzle plate, a bucket wheel, buckets disposed about the periphery of said bucket wheel, and a guard ridge extending from said nozzle plate toward said bucket wheel, the clearance between said guard ridge and said bucket wheel being less than the clearance between said buckets and the nozzle plate.

3. In a steam turbine, the combination with an inclosing cylinder, of a shaft extending therethrough, nozzle plates dividing said cylinder into a plurality of compartments, bucket wheels in the form of plane disks of sheet material secured to said shaft and adapted to rotate therewith in said compartments, buckets for said bucket wheels, the blades of said buckets being symmetrical and their angles of entrance and exit being equal, arms extending from the blades of said buckets adapted to clamp over the edge of the bucket disks, and rivets passing through said arms and disks to secure said buckets in place.

4. In a steam turbine, the combination with an inclosing cylinder, of a shaft extending therethrough, nozzle plates dividing said cylinder into a plurality of compartments, spiders secured to said shaft, a bucket disk in the form of a plane disk of sheet material in each compartment secured to one of said spiders, bucket blades extending from and at right angles across and about the periphery of each bucket disk, said bucket blades being symmetrical and the angles of entrance and exit thereof being equal, two arms extending downwardly from each bucket blade adapted to saddle over the edge of the bucket disk, and rivets passing through said arms and disks, the bucket disks and buckets being entirely symmetrical.

5. In a steam turbine, the combination with an inclosing cylinder, of a shaft extending therethrough, nozzle plates dividing said cylinder into a plurality of compartments, bucket wheels in the form of sheet metal plane disks secured to said shaft and adapted to rotate in said compartments, and semi-circular symmetrical buckets secured over the entire peripheral edge of said disks, the center of gravity of each disk lying in a radial plane.

6. In a steam turbine, the combination with an inclosing cylinder, of a shaft extending therethrough, annular pockets extending about the interior of said cylinder, nozzle plates secured at their periphery in said pockets, passageways through the rims of said nozzle plates, said nozzle plates dividing said cylinder into a plurality of compartments, similar bucket wheels, one in each compartment, said bucket wheels having a disk portion and a hub portion secured to said shaft, and buckets secured about the peripheral edge of each bucket wheel, the hub of each bucket wheel being encircled by the hub of the corresponding nozzle plate.

7. In a steam turbine, the combination with a cylindrical inclosing shell, of a shaft extending axially therethrough, nozzle plates arranged within said cylindrical shell to divide said shell into a plurality of compartments, passageways through the rims of said nozzle plates, bucket wheels secured to said shaft, buckets disposed about the periphery of said bucket wheels to travel by the outlets of said passageways, and annular shoulders extending from said cylindrical shell about one edge of the nozzle plates to support said nozzle plates, said shoulders also forming an inclosing wall about these peripheries of said buckets.

In witness whereof, I hereunto subscribe my name this 15th day of July A. D., 1904.

WILLIAM L. WATERS.

Witnesses:
 JOHN E. HUBEL,
 W. L. MARCY.